(12) United States Patent
Ciarmatori et al.

(10) Patent No.: US 12,454,174 B2
(45) Date of Patent: Oct. 28, 2025

(54) LOCKING SYSTEM FOR A VEHICLE LID

(71) Applicant: CEBI ITALY S.P.A., Dronero (IT)

(72) Inventors: Marco Ciarmatori, Camerano (IT); Riccardo Grossi, Osimo (IT); Tommaso Riste', Jesi (IT)

( * ) Notice: Subject to any disclaimer, the term of this patent is extended or adjusted under 35 U.S.C. 154(b) by 455 days.

(21) Appl. No.: 18/006,226

(22) PCT Filed: Jul. 8, 2021

(86) PCT No.: PCT/EP2021/068959
§ 371 (c)(1),
(2) Date: Jan. 20, 2023

(87) PCT Pub. No.: WO2022/017813
PCT Pub. Date: Jan. 27, 2022

(65) Prior Publication Data
US 2023/0286375 A1 Sep. 14, 2023

(30) Foreign Application Priority Data
Jul. 21, 2020 (IT) .......................... 102020000017677

(51) Int. Cl.
*B60K 15/05* (2006.01)
*E05B 81/06* (2014.01)
*E05B 83/34* (2014.01)

(52) U.S. Cl.
CPC .............. *B60K 15/05* (2013.01); *E05B 81/06* (2013.01); *E05B 83/34* (2013.01); *B60K 2015/053* (2013.01); *B60K 2015/0538* (2013.01); *B60K 2015/0576* (2013.01); *B60K 2015/0584* (2013.01)

(58) Field of Classification Search
CPC .............. B60K 15/05; B60K 2015/053; B60K 2015/0538; B60K 2015/0576; B60K 2015/0584; B60K 2015/0546; B60K 2015/0561; E05B 81/06
USPC ...................................................... 296/97.22
See application file for complete search history.

(56) References Cited

FOREIGN PATENT DOCUMENTS

| CN | 107762330 A | * | 3/2018 | ............. E05B 81/34 |
|----|-------------|---|--------|------------------------|
| CN | 111321957 A |   | 6/2020 |                        |
| EP | 3318438 A1  |   | 5/2018 |                        |
| EP | 3348432 A1  |   | 7/2018 |                        |
| EP | 3446910 A1  |   | 2/2019 |                        |

(Continued)

OTHER PUBLICATIONS

CN107762330 Text (Year: 2018).*

(Continued)

*Primary Examiner* — Dennis H Pedder
(74) *Attorney, Agent, or Firm* — Egbert, McDaniel & Swartz, PLLC

(57) ABSTRACT

A locking system for locking a lid of a vehicle including: a lid, a movement actuator for moving the lid, a lock having a roto-translating pin with a head suitable for being engaged in a seat of the lid, and an actuator of the lock that moves the roto-translating pin. The actuator has an electric motor and a motion reducer. The electric motor is suitably configured so as to rotate in a first rotational direction to move the roto-translating pin from a retracted position to an extracted position, and in a second rotational direction to move the roto-translating pin from the extracted position to the retracted position.

14 Claims, 12 Drawing Sheets

(56) References Cited

FOREIGN PATENT DOCUMENTS

GB            2563526 A    12/2018
WO     2008059543 A1    5/2008

OTHER PUBLICATIONS

International Search Report for corresponding PCT/EP2021/068959 dated Sep. 28, 2021.
Written Opinion of the International Searching Authority for corresponding PCT/EP2021/068959 dated Sep. 28, 2021.

* cited by examiner

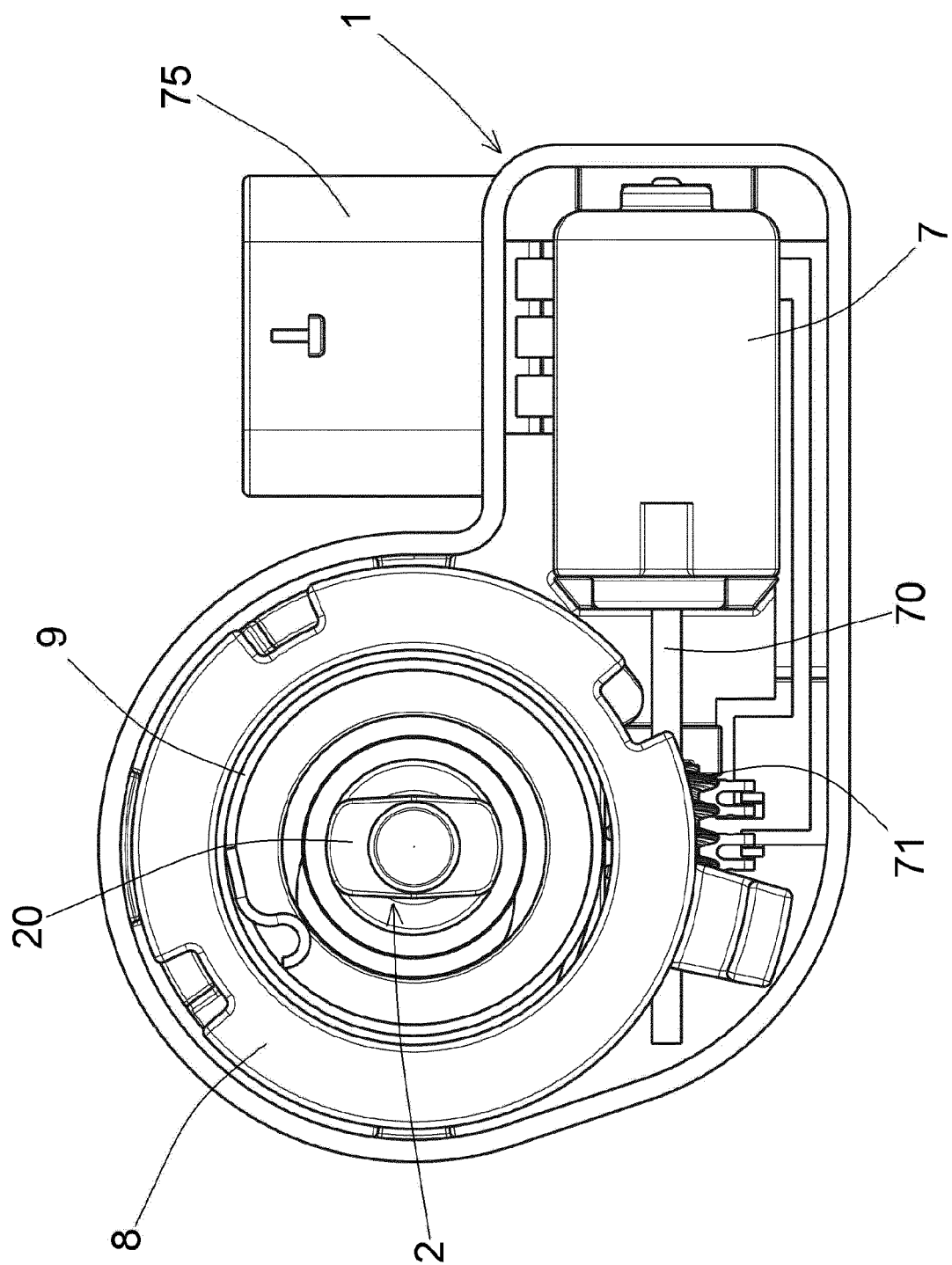

LOCKING SYSTEM FOR A VEHICLE LID

The present invention relates to a locking system for a vehicle 11d.

Vehicles are generally provided with a lid that is hinged by means of a hinge to the body of the vehicle in order to open/close an opening that provides access to a fuel system of the vehicle, which may be, for illustrative purposes, a fuel tank for vehicles with internal combustion engines or an electrical connector for the electrical charge of a vehicle battery in the case of vehicles with electric motor.

A lock maintains the lid in a closed position. The lock is actuated by an actuator in order to go from a closed condition to an open condition. When the lock is in the open condition, the lid is generally operated manually by the user.

Recently, attempts have been made to avoid said manual operation of the lid. Therefore, the lid is moved by means of an actuator disposed in correspondence with the hinge of the lid.

However, it must be considered that the lid works as a lever with fulcrum in the hinge. The force of the actuator that moves the lid is applied close to the fulcrum of the lever. Therefore, said lever is particularly disadvantageous and the actuator must provide a high force in order to move the lid. Consequently, such an actuator is complex, expensive and oversized.

In addition, a seal is provided in the body of the vehicle, around the opening, and is compressed by the lid in order to ensure a tight closure. As a result, the force from the actuator that moves the lid must be sufficient to compress said seal.

Such a movement system of the lid is impaired by disadvantages at low temperatures, below 0° C., because the seal of the opening of the lid will freeze and will stiffen, with the possibility of ice forming between the lid and the body of the vehicle. As a result, during the closing operation, the force of the actuator is not sufficient to compress the frozen seal, and during the opening operation, it does not guarantee to overcome the resistance of the ice that is formed between the lid and the body of the vehicle.

It must be considered that the actuator of the lock of the lid has only the function to open and close the lock, and not to move the lid.

In the name of the same applicant, EP3348432A1 discloses an actuator for a closing device of a fuel tank lid that comprises a roto-translating pin stressed by a spring to an extracted opening position of the lock. Evidently, the force exerted by the spring on the roto-translating pin is not sufficient for the roto-translating pin to move a lid that is adhered to a frozen seal.

The purpose of the present invention is to eliminate the drawbacks of the prior art, by disclosing a locking system for a vehicle lid that is practical, efficient, reliable, inexpensive and easy to make and install.

Another purpose of the present invention is to provide such a locking system for a vehicle lid that is capable of operating at low temperatures when a seal of the lid is frozen.

These purposes are achieved according to the invention with the characteristics of the independent claim 1.

Advantageous embodiments of the invention appear from the dependent claims.

Additional features of the invention will be clearer from the following detailed description, which refers to a merely illustrative, not limiting embodiment, as shown in the appended figures, wherein:

FIG. 5 is a top view of the actuator of FIG. 2, wherein the cover is omitted;

Figure 1:
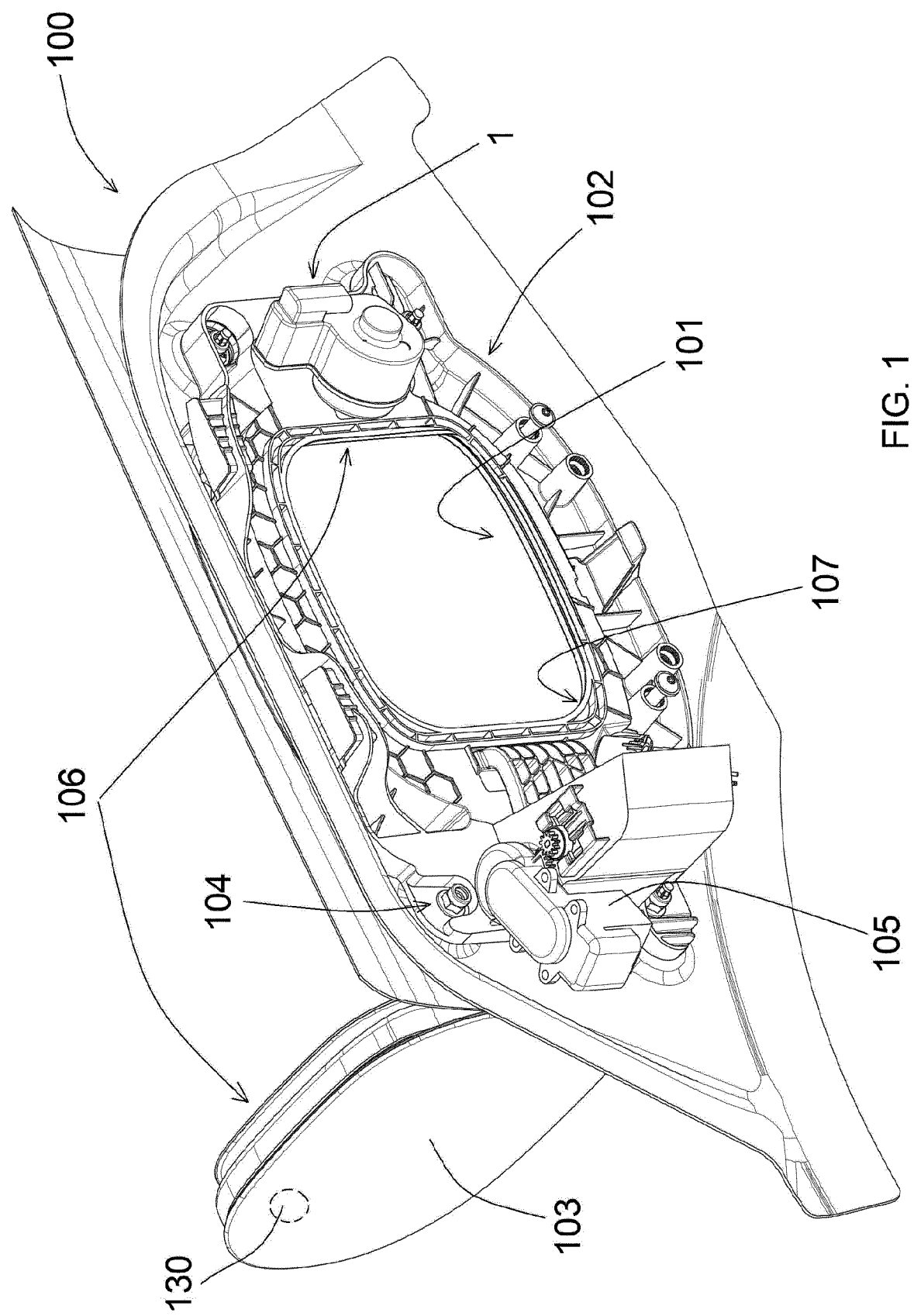
FIG. 1 is a perspective view of the locking system for a vehicle lid according to the invention.

With reference to FIG. 1, the locking system of the invention is disclosed, which is generally indicated with reference numeral (100).

The locking system (100) comprises:
- a lid (103) hinged by means of a hinge (104) to a part of the body (102) of a vehicle wherein an opening (101) is obtained in such a way to close/open the lock (101),
- a movement actuator (105) mounted in the part of body (102) and suitable for moving the lid (103),
- a lock (106) suitable for closing the lid (103) in a closing position, and
- an actuator (1) of the lock suitable for actuating the lock (106).

The opening (101) provides access to a power system of the vehicle, such as an opening of a fuel tank or an electrical connector for charging a battery pack of the vehicle.

The lid (103) may rotate around an axis of the hinge (104) in such a way to go from an open position, wherein the opening (101) is accessible for a user, to a closed position, wherein the lid (103) closes the opening (101). In this way, the lid (103) makes a rotation of about 90°.

The movement actuator (105) actuates the lid (103) near the hinge (104). Therefore, the actuator (103) must have a sufficient force to move the lid and rotate the lid by approximately 90° in one direction and in the opposite direction.

A seal (107), such as an O-ring seal, is arranged in the part of the body (102) around the opening (101). When the lid (103) is in closed position, the lid compresses the seal (107) in such a way to ensure a tight seal and prevent foreign matter, such as water, dust and the like, from entering the opening (101) from outside the vehicle.

The actuator (1) of the lock is mounted in the body of the vehicle in a diametrically opposite position relative to the movement actuator (105) with respect to a center of the opening (101).

The lock (106) includes a latch that is engaged in a seat (130) of the lid (103) obtained in an end portion of the lid, distal with respect to the hinge (104).

Figure 3:
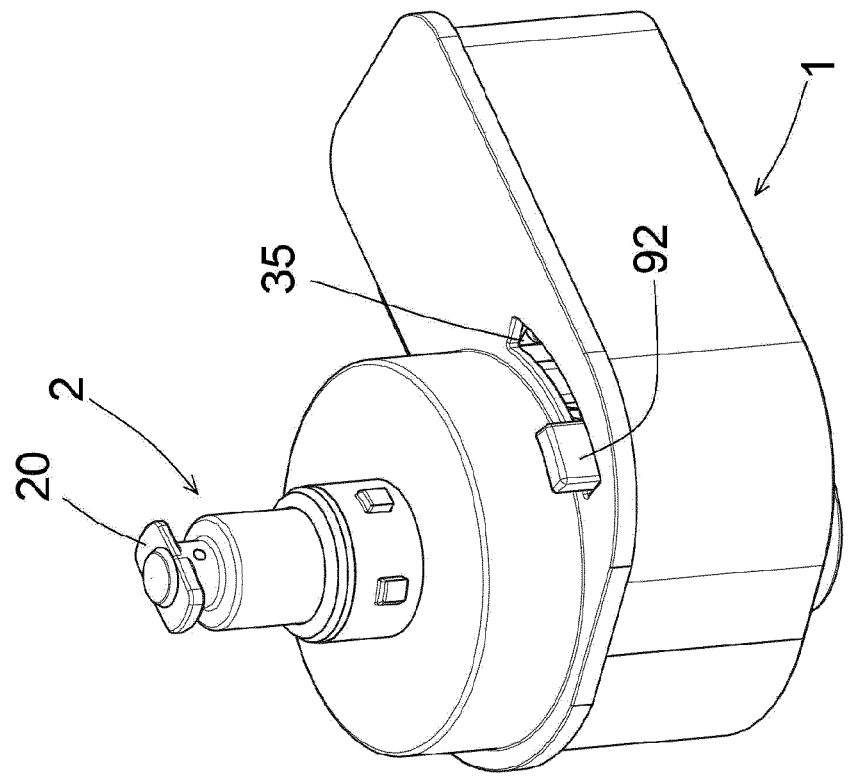
FIG. 3 is the same view as FIG. 2, wherein the roto-translating pin is in extracted opening position.
Figure 2:
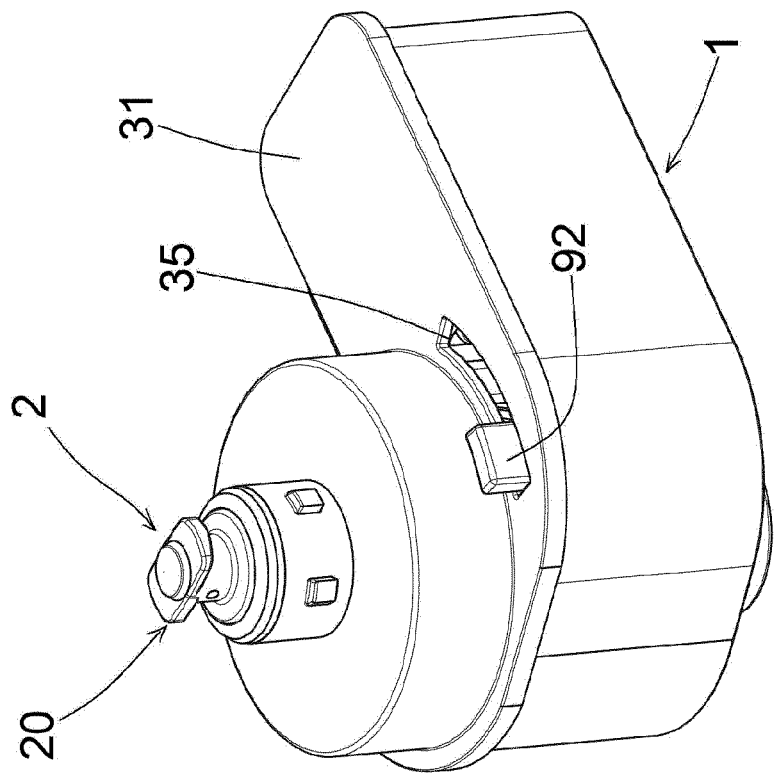
FIG. 2 is a perspective view of an actuator of the lock of the system of FIG. 1, wherein the roto-translating pin is in retracted closing position.

With reference to FIGS. 2 and 3, the latch of the lock comprises a roto-translating pin (2) provided with a T-shaped head (20) suitable for being engaged in the seat (130) of the lid. To this end, the seat (130) of the lid has a rectangular opening in order to accommodate the head (20) of the roto-translating pin and undercut parts to lock the head (20) of the roto-translating pin in bayonet coupling mode.

The roto-translating pin (2) is moved by the actuator (1) from a retracted locking position (FIG. 2), wherein the head (20) of the roto-translating pin is engaged in the seat (130) of the lid, locking the lid in closed position, to an extracted opening position (FIG. 3), wherein the head (20) of the roto-translating pin is disengaged from the seat (130) of the lid, in such a way that the lid can be moved in the open position.

Hereinafter, the terms "lower" and "upper" refer to the arrangement of the figures.

Figure 4:
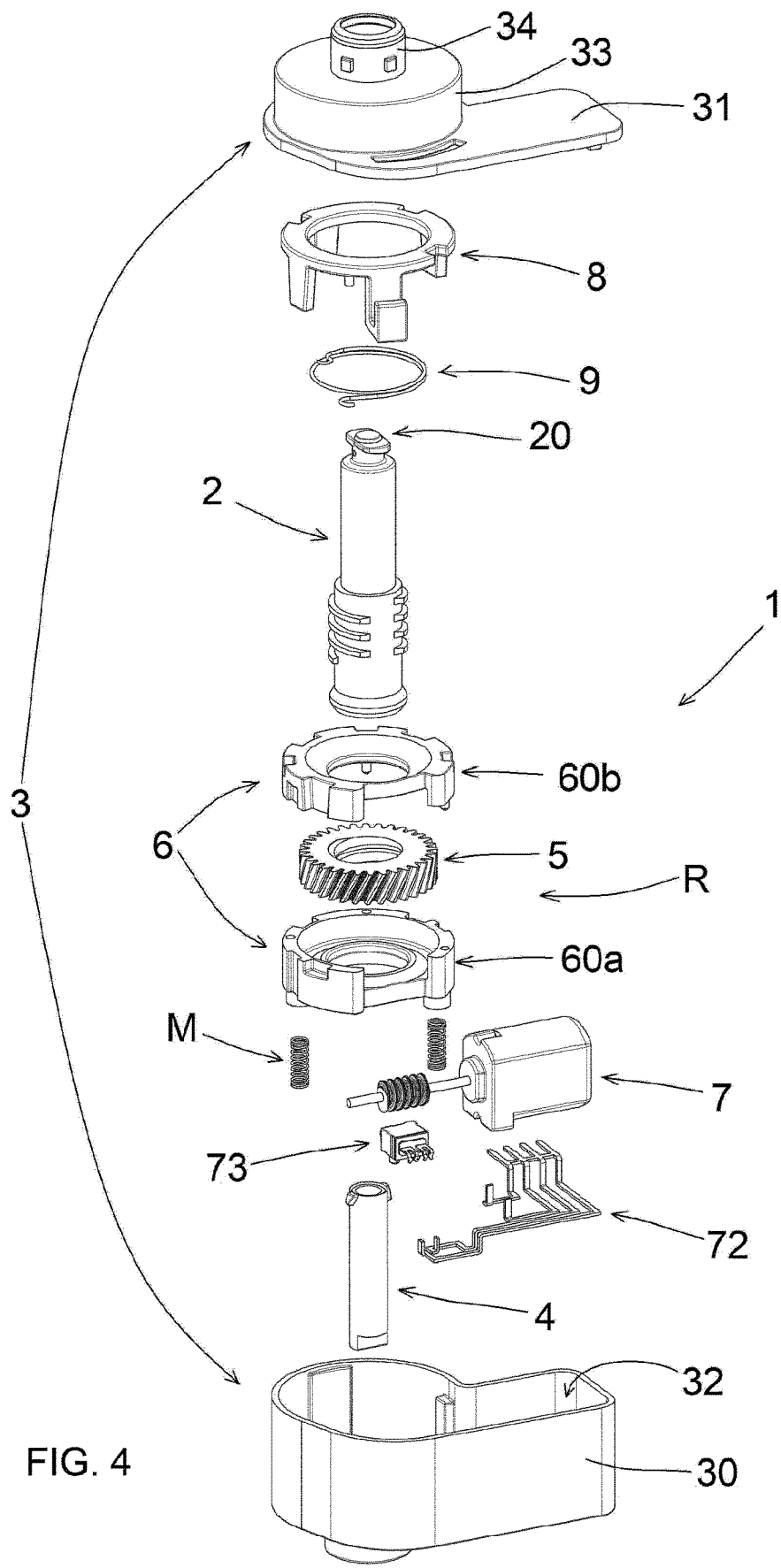
FIG. 4 is an exploded perspective view of all parts of the actuator of FIG. 2.

With reference to FIG. 4, the actuator (1) comprises a box (3), wherein the roto-translating pin (2) and parts of the actuator are mounted.

The box (3) comprises a housing (30) and a cover (31). The housing (30) has a seat (32) wherein some parts of the actuator are disposed. The cover (31) has a seat (33). A guide tang (34) protrudes externally from the seat of the cover. The roto-translating pin (2) is disposed in the box (3), and the head (20) of the roto-translating pin protrudes externally from the guide tang (34) of the cover, which acts as a guide for the roto-translating movement of the roto-translating pin.

A stop shank (36) protrudes internally in the seat of the cover.

Figure 4A:
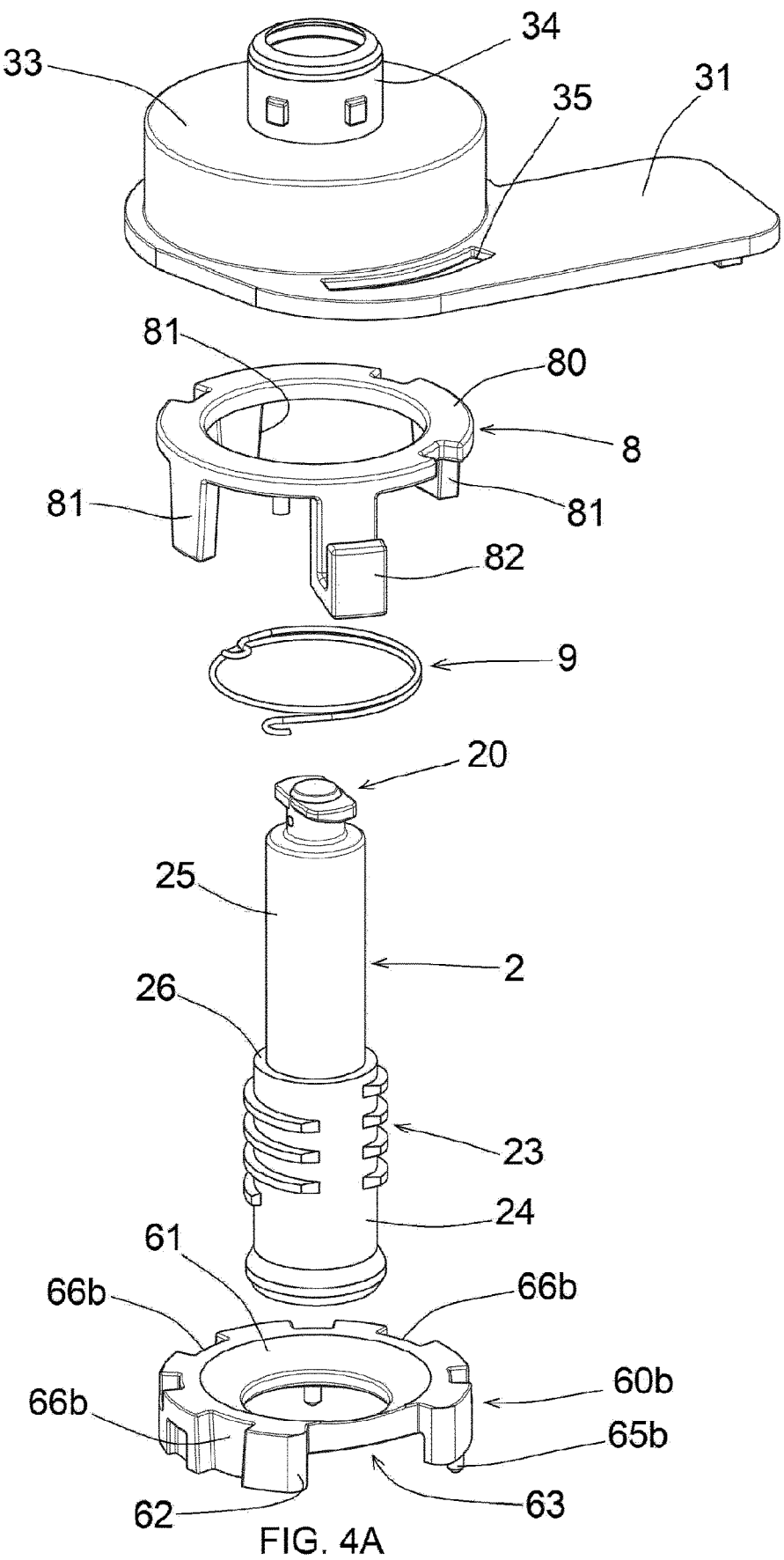
FIGS. 4A and 4B are enlarged views of some parts of the actuator of FIG. 4.
Figure 6:
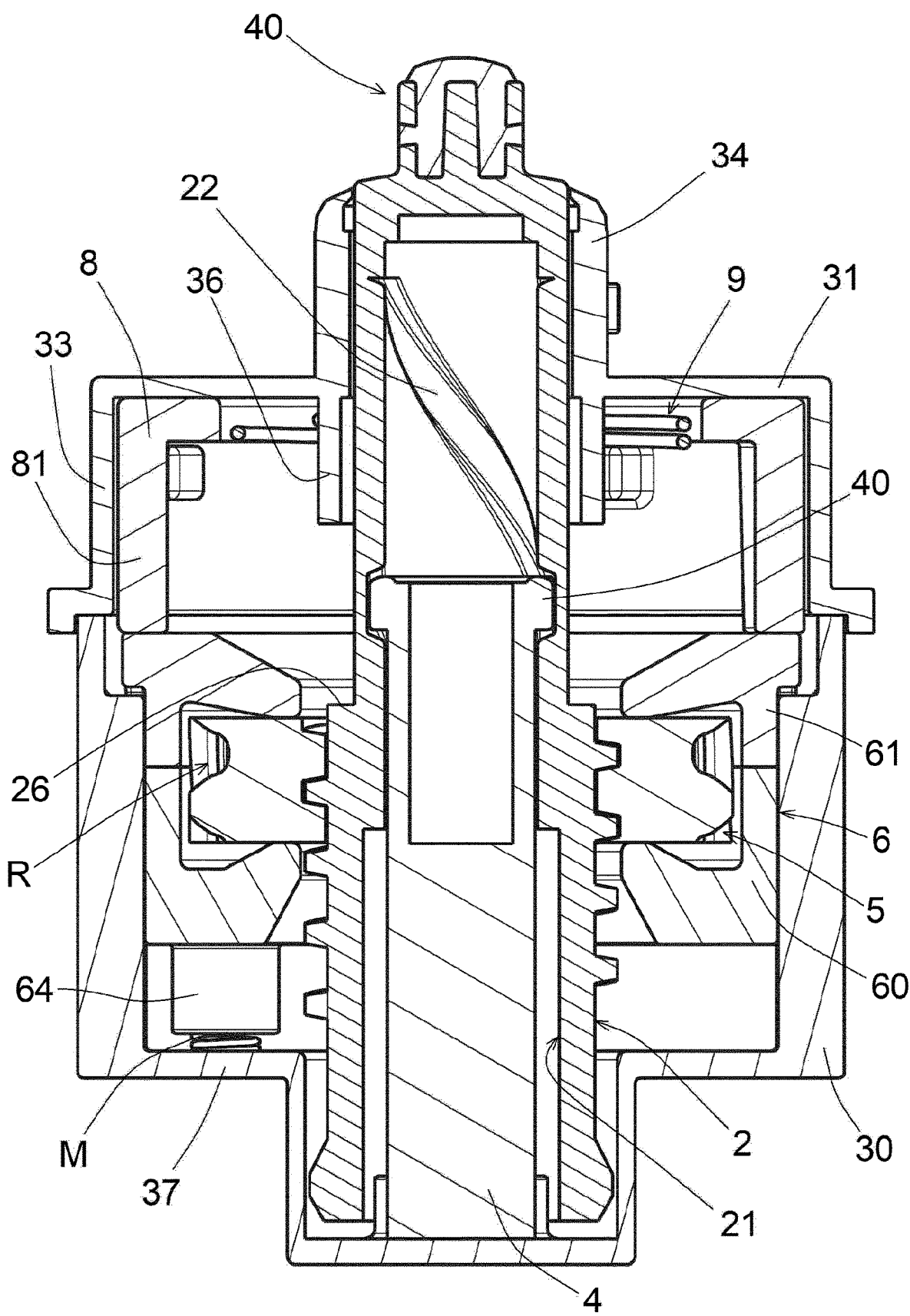
FIG. 6 is a sectional axial view of the actuator of FIG. 2.
Figure 7:
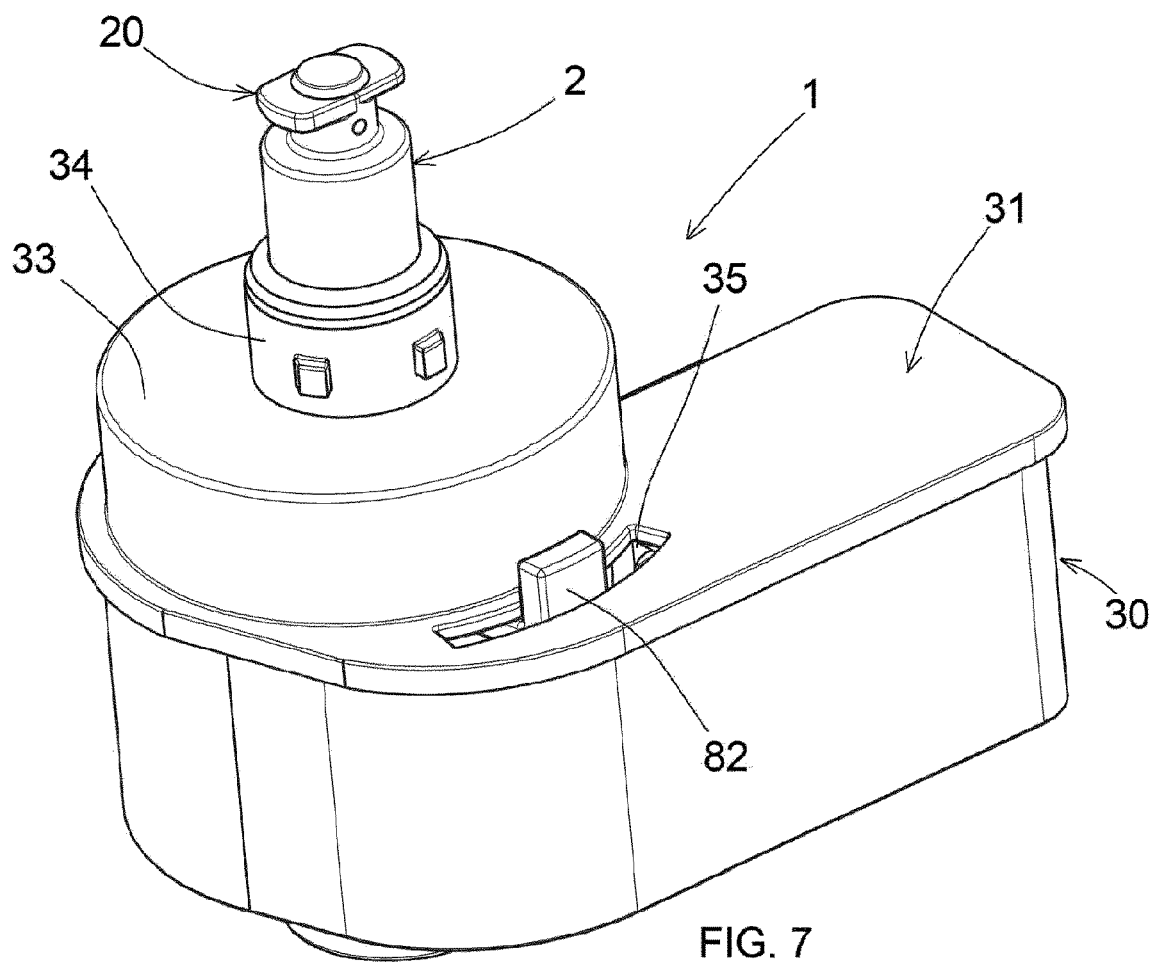
FIG. 7 is the same view as FIG. 3, wherein the emergency device is omitted.
Figure 8:
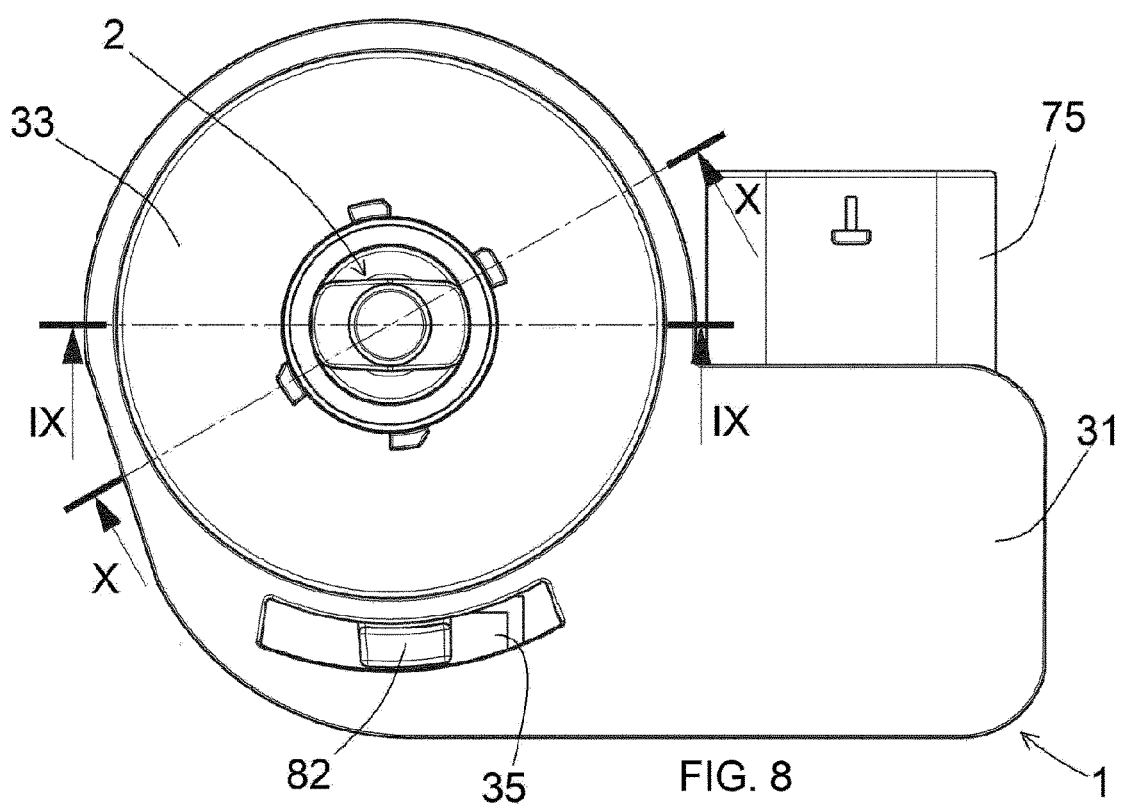
FIG. 8 is a top view of the actuator of FIG. 7.

With reference to FIGS. 4A and 6, the roto-translating pin (2) has a substantially cylindrical shape and is internally hollow with an axial cavity (21) that is open inferiorly.

The roto-translating pin (2) has an internal thread (22) and an external thread (23). The roto-translating pin (2) has a lower portion (24) having an outer diameter that is greater than the outer diameter of an upper portion (25), in such a way to form a stop collar (26). The stop collar (26) of the roto-translating pin is stopped against the stop tang (36) of the cover, when the roto-translating pin is in extracted position.

The T-shaped head (20) protrudes from the upper portion (25).

The internal thread (22) is a long-pitch thread for converting a small radial movement into a large axial movement. Instead, the external thread (23) is a short-pitch thread with respect to the internal thread. The external thread (23) is obtained in the lower portion (24) of the roto-translating pin.

Figure 4B:
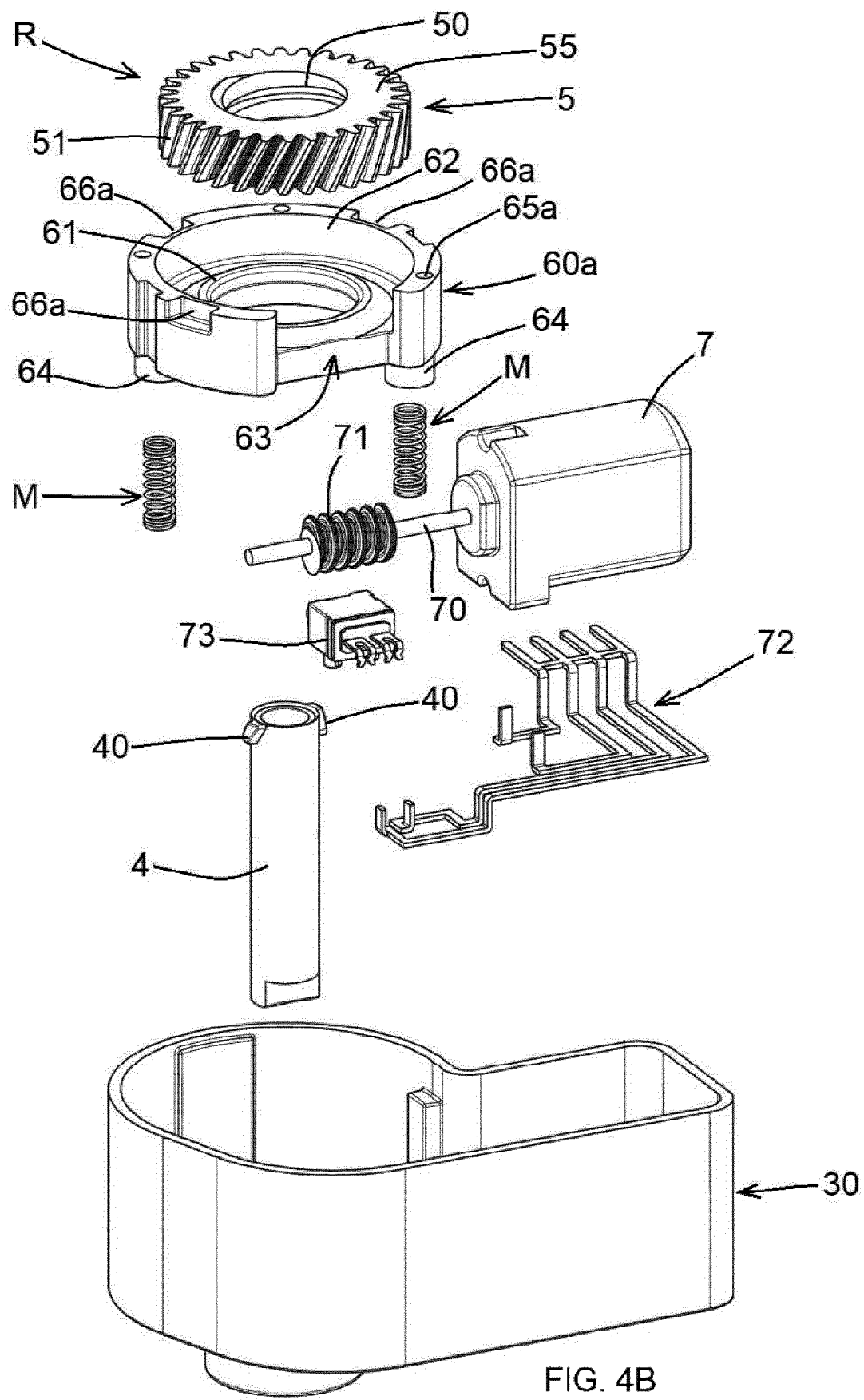

With reference to FIG. 4B, a column (4) is fixedly mounted in the housing (30) of the box. The column (4) has teeth (40) that project radially outwardly near an upper end of the column. The column (4) is disposed in the axial cavity (21) of the roto-translating pin in such a way that the teeth (40) of the column are engaged in screwing mode in the internal thread (22) of the roto-translating pin.

In view of the above, a force or moment applied on the roto-translating pin (2) determines a roto-translation of the roto-translating pin because the internal thread (22) of the roto-translating pin slides into the teeth (40) of the column.

An electric motor (7) actuates the roto-translating pin (2) in roto-translation by means of motion reduction means (R).

The motion reduction means (R) comprise a gear (5) mounted around the roto-translating pin (2). The gear (5) comprises a toothed wheel (55) having an external toothing (51) of helical type. The toothed wheel (55) also has an internal thread (50) that is engaged in screwing mode with the external thread (23) of the roto-translating pin.

With reference to FIG. 6, the gear (5) is rotatably mounted in a support (6) disposed in the housing (30) of the box.

The support (6) comprises a first half-shell (60a) and a second half-shell (61a) with annular shape, disposed around said roto-translating pin and coupled together in such a way so as to contain the gear (5).

The half-shells (60a, 60b) comprise an annular body (61) and a cylindrical side wall (62) disposed around the annular body. The cylindrical side wall (62) has an opening (63).

The first half-shell (60a) has seats (64) that project downwards for housing springs (M). As shown in FIG. 6, each spring (M) is disposed between a bottom wall (37) of the housing and the seat (64) of the first half-shell in such a way to push the support (6) upwards.

The second half-shell (60b) has pins (65b) that are engaged in holes (65a) of the first half-shell, in fit-in coupling mode. The pins (65b) and the holes (65a) are obtained in the cylindrical side walls of the two half-shells.

Longitudinal grooves (66b) parallel to the axis of the half-shell are provided in the side wall (62) of the second half-shell (60b). For illustrative purposes, three longitudinal grooves (66b) are provided.

Recessed seats (66a) are provided in the side wall (62) of the first half-shell (60a) in correspondence with the longitudinal grooves (66b) of the second half-shell, when the two half-shells are coupled. For illustrative purposes, three recessed seats (66a) are provided.

The electric motor (7) has a drive shaft (70) provided with a worm screw (71) disposed in correspondence with the openings (63) of the half-shells of the support in order to engage with the external toothing (51) of the gear.

Therefore, a rotation of the worm screw (71) determines a rotation of the gear (5). Thus, the internal thread (50) of the gear (5) is screwed on the external thread (23) of the roto-translating pin, causing a roto-translation of the roto-translating pin (2).

Such a roto-translation of the roto-translating pin is guided by the screwing of the external thread (23) of the roto-translating pin in the gear (5) and by a screwing of the internal thread (22) of the roto-translating pin in the teeth (40) of the column.

The electric motor (7) is suitably configured so as to rotate in a first direction and in a second direction opposite to the first direction.

When the electric motor (7) rotates in the first direction, the roto-translating pin (2) is moved from the retracted position (FIG. 2) to the extracted position (FIG. 3). When the electric motor (7) rotates in the second direction, the roto-translating pin (2) is moved from the extracted position to the retracted position.

The roto-translating pin makes a travel of approximately 8-20 mm to go from the retracted position to the extracted position.

When the lid (103) is closed and the user wants to open it, the electric motor (7) is actuated in the first rotational direction. Consequently, the roto-translating pin (2) is moved from the retracted position (FIG. 2) to the extracted position (FIG. 3), making a travel of approximately 8-20 mm.

Considering that the travel of the roto-translating pin (2) is approximately ¹/₁₀ of the length of the lid, the lid pushed by the roto-translating pin makes a rotation of approximately 5° that is sufficient to detach the lid from the seal (107) if said seal is frozen.

Successively, when the roto-translating pin (2) is in the open position, the movement actuator (105) is actuated to rotate the lid around the hinge (104) for approximately 85°, bringing the lid to the open position.

When the lid (103) is in open position and the user wants to close it, the movement actuator (105) is actuated to rotate the lid around the hinge (104) for approximately 85° until the seat (130) of the lid is engaged in the head (20) of the roto-translating pin. Now, the electric motor (7) is actuated in the second rotational direction. As a result, the head (20) of the roto-translating pin is engaged in the seat (30) of the lid and the roto-translating pin (2) is moved from the extracted position to the retracted position, driving the lid (103), in conjunction with the action of the movement actuator (105), in such a way that the lid (103) compresses the seal (107).

It must be considered that the roto-translating pin applies a force on the lid (103) at a distal end from the hinge (104), so the lid behaves as a particularly advantageous lever and a minimal application of force on the lid is sufficient to detach the lid from the seal or to compress the seal. In addition, the gear (5) is suitably configured so as to provide a high reduction ratio between the worm screw (71) and the gear (5), in such a way that a minimum power of the electric motor (7) is sufficient to ensure a rotation of the gear (50), which in turn determines a roto-translation of the roto-translating pin (2).

A position sensor (73) is disposed in the housing (30) of the box to detect when the roto-translating pin (2) is in extracted open position and when it is moved from the extracted open position.

Said position sensor (73) is connected to a control unit in order to send control signals to the movement actuator (105). When the position sensor (73) detects that the roto-translating pin (2) is in extracted position, the movement actuator (105) begins to move the lid (103) toward the open position.

During the closing operation, the movement actuator (105) moves the lid (103) toward the closing position and the seat (130) of the lid is engaged with the head (20) of the roto-translating pin. Such a rotation of the lid (103) is detected via a sensor (encoder) by the control unit that drives the actuator (1) of the lock, assisting the movement actuator (105) in driving the lid to the closing position.

Figure 10:
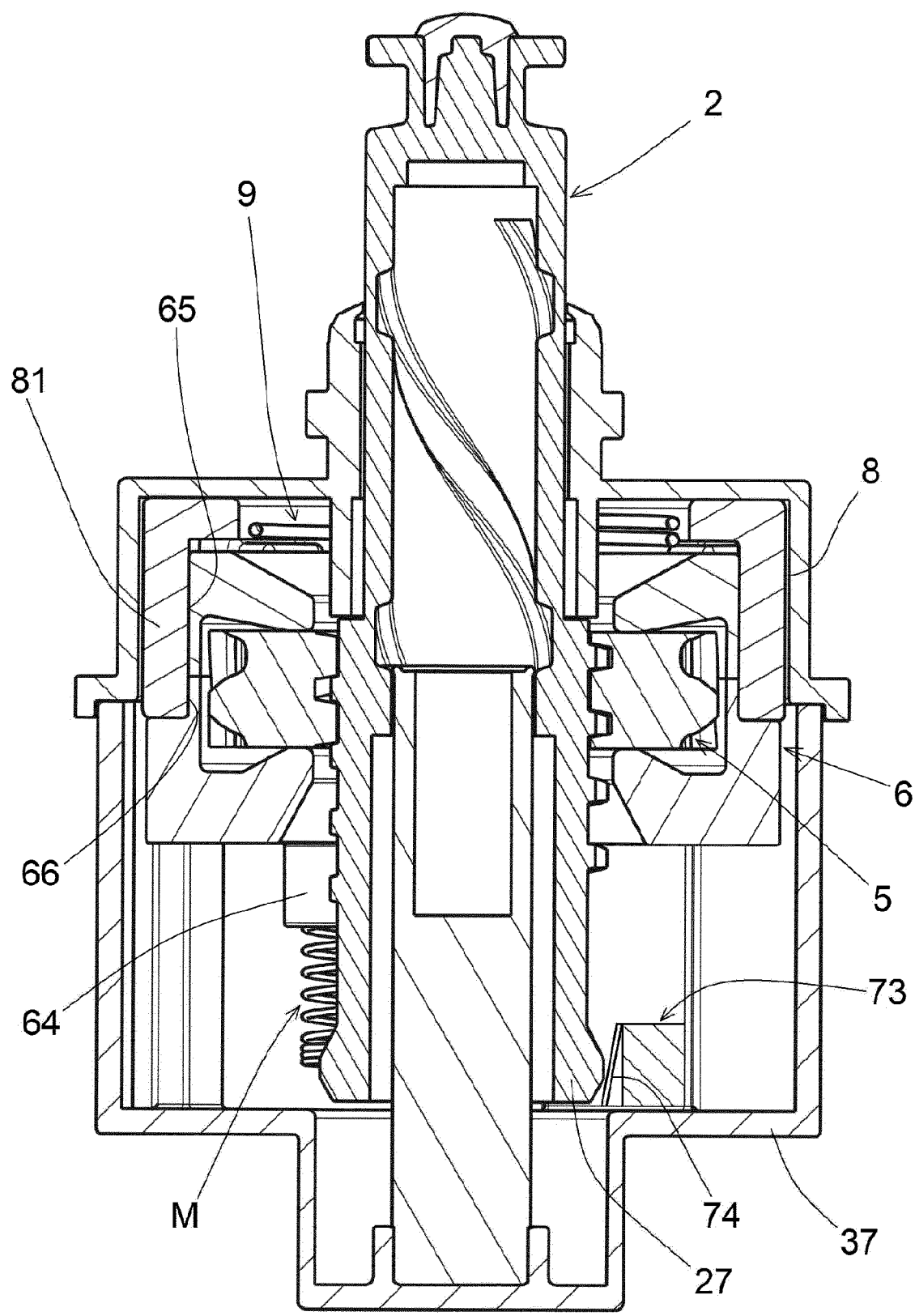

With reference to FIG. 10, the position sensor (73) may be a microswitch with a reed (74) that is touched by a projection (27) of the roto-translating pin when the roto-translating pin is in extracted position.

With reference to FIGS. 4 and 4B, a set of electrical contacts (72) connect the electric motor (7) and the position sensor (73) to an electrical connector (75) (shown in FIG. 5).

With reference to FIGS. 4 and 4A, the actuator (1) also comprises a safety device (8) that can be manually actuated by the user to unlock the movement of the roto-translating pin (2) when the electric motor (7) is stopped, in the event that the electric motor (7) fails or the gear (5) jams. Otherwise said, the safety device (8) allows the gear (5) to be disengaged from the worm screw (71) of the electric motor.

The safety device (8) is housed in the seat (33) of the cover. The safety device (8) comprises an annular body (80) that is arranged around the roto-translating pin and tongues (81) that protrude inferiorly from the annular body (80) abutting against the side wall (62) of the second half-shell of the support. In this way, the support (6) is locked in place between the bottom wall (37) of the housing and the safety device, and the springs (M) are compressed into the seats (64) of the first half-shell of the support.

The tongues (81) of the support are suitably dimensioned in such a way to slide in the grooves (66b) of the second half-shell and enter the seats (66a) of the first half-shell. If the safety device is rotated so that the tongues (81) of the safety device are disposed in correspondence with the grooves (66b) of the second half shell, then, the support (2) is no longer locked in position and can translate in the box (3) because the tongues (81) of the safety device can enter the grooves (66b) of the second half-shell and the seats (66a) of the first half-shell.

In this way, the assembly comprising the support (6), the gear (5) and the roto-translating pin (2) can translate in the box, disengaging the gear (5) from the worm screw (71).

During such movement of the assembly that comprises the roto-translating pin (2), the support (6) and the gear (5), the roto-translating pin (2) performs a correct roto-translation, due to the internal thread (22) of the roto-translating pin that slides in the teeth (40) of the column. In fact, without such an arrangement, the roto-translating pin would not perform a roto-translation and the head (20) of the roto-translating pin would not disengage the seat (130) of the lid, during the movement of the assembly that comprises the roto-translating pin (2), the support (6) and the gear (5).

The safety device (8) comprises a lever (82) that protrudes from the annular body (80) and comes out of the cover (31) of the box through a slot (35) in the cover, in order to be manually operated by the user. The lever (82) has a "U" shape and is suitable for being connected to a cable that can be manually operated by the user.

Then, the safety device (8) can move from a locking position, wherein it locks the support (6), to an unlocking position, wherein it unlocks the support (6) that can translate in the box.

Figure 9:
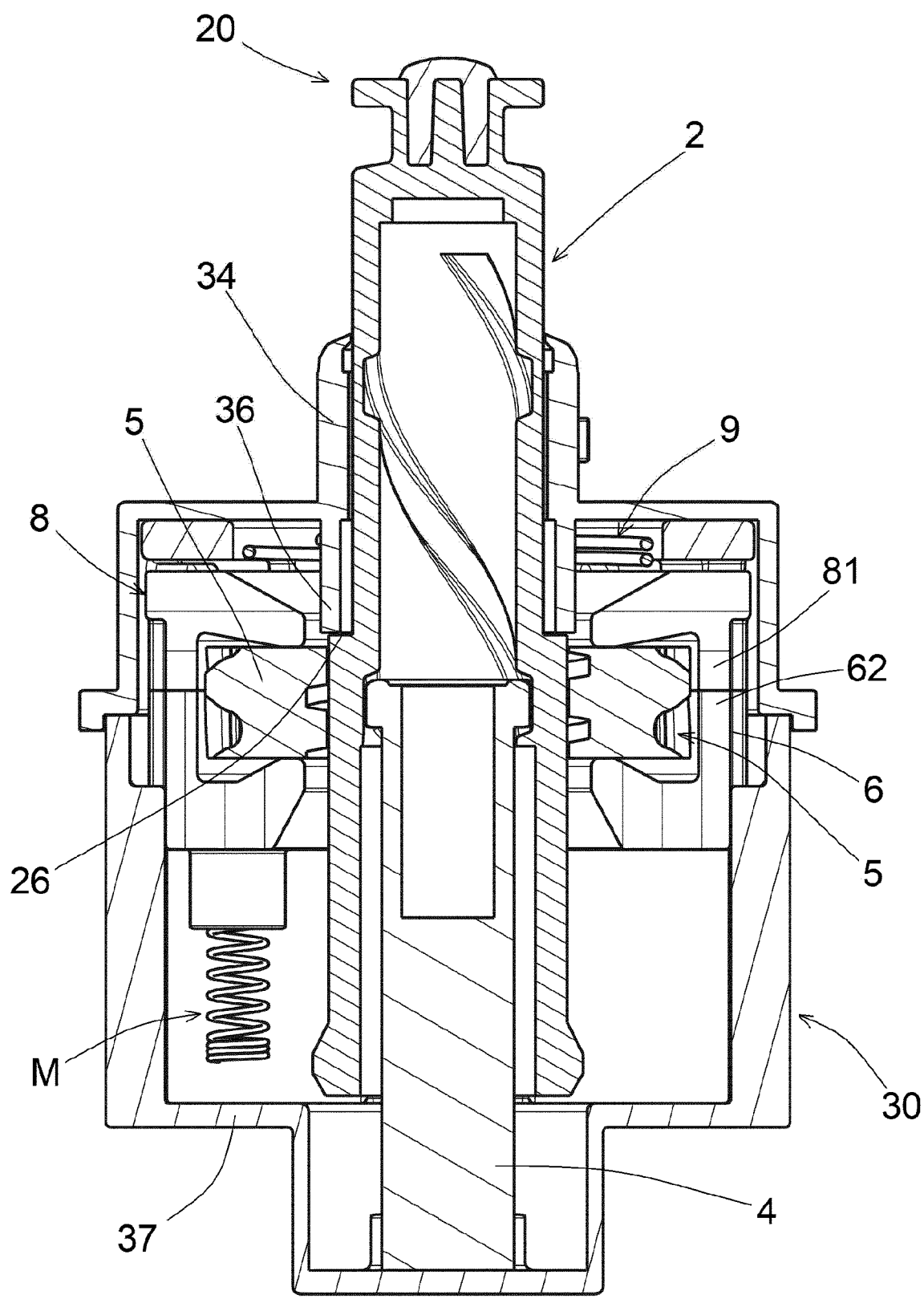
FIGS. 9 and 10 are sectional axial views taken along the sectional planes IX-IX and X-X of FIG. 8.

As shown in FIGS. 9 and 10, when the safety device (8) is in the unlocking position, the springs (M) of the support push the support (6) upwards, therefore the supports that contains the gear (5) brings the roto-translating pin (2) to the extracted position.

A spring (9) of the safety device stresses the safety device (8) in the locking position. The spring (9) is a torsional spring provided with a first end connected to the safety device and a second end connected to the box (3).

Figure 11:
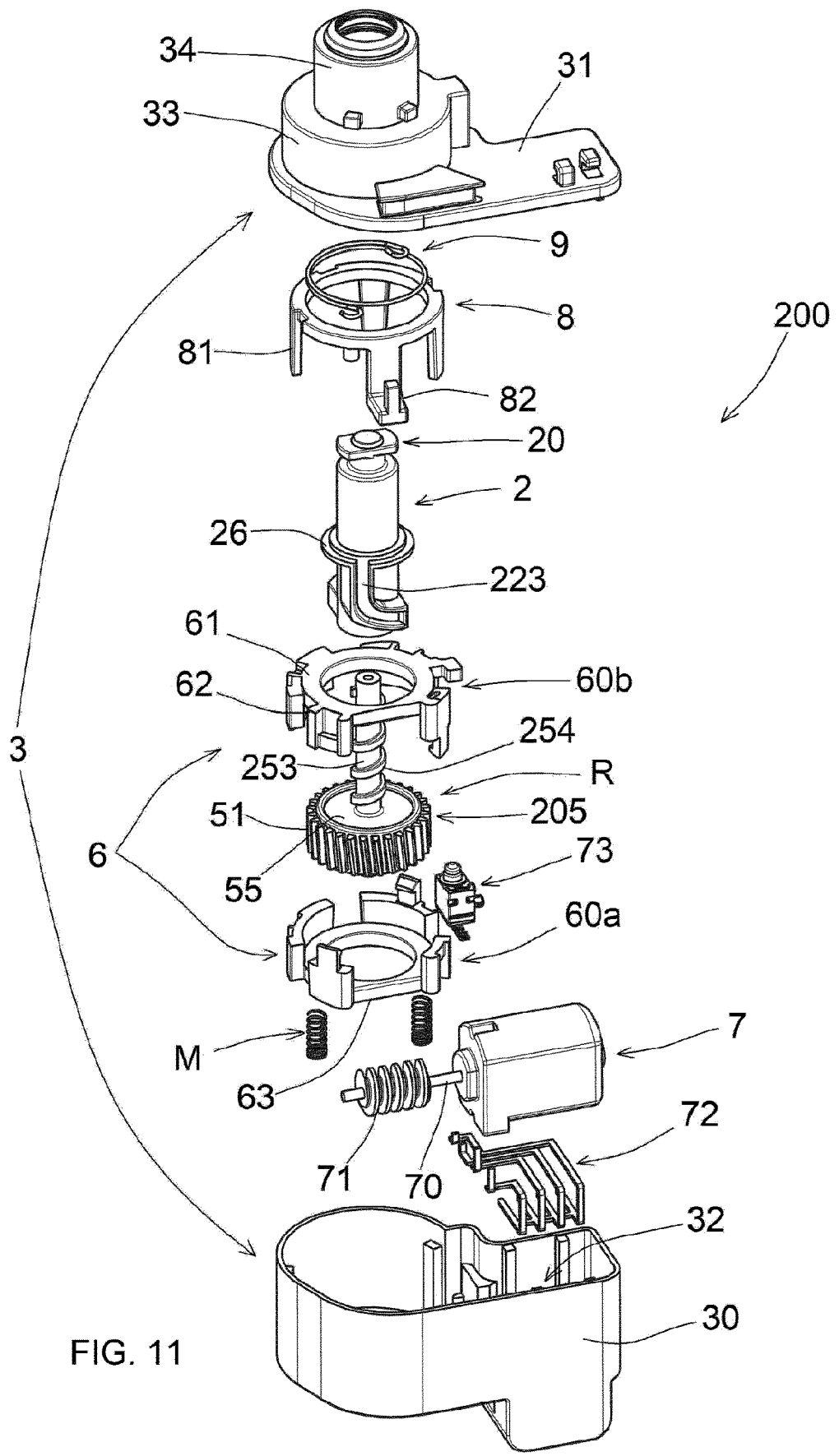
FIG. 11 is an exploded perspective view of a second embodiment of an actuator of the locking system according to the invention.
Figure 12:
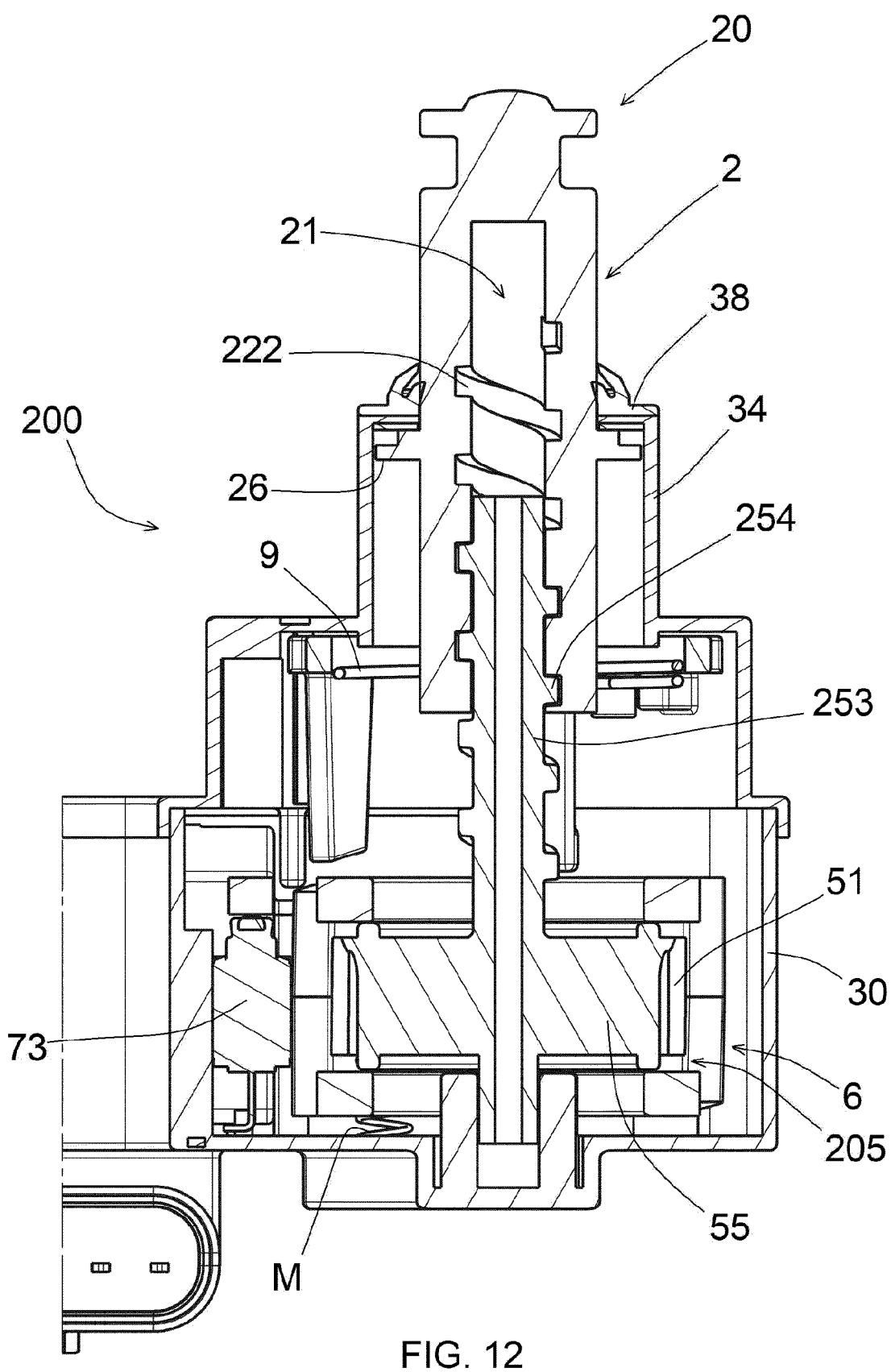
FIG. 12 is a sectional view of the locking system in assembled condition of FIG. 11.

FIGS. 11 and 12 illustrate a second embodiment of an actuator (200), wherein elements that are identical or corresponding to the ones described above will be indicated with the same numerals, omitting their detailed description.

The actuator (200) comprises motion reduction means (R) comprising a gear (205) that comprises a toothed wheel (55) having an external toothing (51) that is engaged with the worm screw (71).

The gear (205) comprises a shaft (253) that protrudes axially from the toothed wheel (55) to enter the axial cavity (21) of the roto-translating pin. The shaft (253) of the gear has an external thread (254) that is engaged in an internal thread (222) of the roto-translating pin. The internal thread (222) of the roto-translating pin is short-pitched, so as to have a suitable reduction ratio for the movement of the roto-translating pin (2) because of the rotation of the shaft (253) of the gear (205).

In such a case, the toothed wheel (55) of the gear (205) is disposed under the roto-translating pin (2).

The actuator (200) is not provided with the shaft (4) fixed to the box, which has been replaced by the shaft (253) of the gear.

The roto-translating pin (2) has a stop collar (26) that is stopped against an internal collar (38) of the guide tang (34). An L-shaped cam surface (223) is provided on the outer surface of the roto-translating pin (2), under the stop collar (26), said L-shaped cam surface (223) being engaged by a pin-shaped follower that protrudes internally from the seat (33) of the cover (31). The purpose of the cam surface (223) is to guide the roto-translation of the roto-translating pin (2).

The invention claimed is:

1. A locking system comprising:
   a vehicle;
   a lid having a hinge connected to a portion of a body of said vehicle, said lid being movable between an open position and a closed position, said lid defining an opening when in the open position;
   a movement actuator mounted in the portion of the body adjacent to the hinge, said movement actuator adapted to move said lid from the closed position to the open position;
   a lock having a roto-translating pin with a head, the roto-translating pin being engaged in a seat of said lid in a position distal the hinge, said lock adapted to maintain said lid in the closed position; and
   an actuator connected to said lock so as to move the roto-translating pin from a retracted position to an extracted position, wherein said actuator comprises:
   an electric motor; and
   a motion reducer disposed between said electric motor and the roto-translating pin so as to cause a roto-translation movement to the roto-translating pin, said electric motor configured so as to rotate in a first rotational direction to move the roto-translating pin from the retracted position so as to push said lid from the closed position and in a second rotational direction so as to move the roto-translating pin from the extracted position to the retracted position so as to pull said lid towards the closed position.

2. The locking system of claim 1, wherein said motion reducer has a gear comprising a gear wheel with external teeth, the gear being engaged with a worm screw mounted on a shaft of said electric motor.

3. The locking system of claim 2, wherein said gear has an internal thread engaged with an external thread of the roto-translating pin.

4. The locking system of claim 2, wherein the roto-translating pin has an axial cavity with an internal thread, said actuator having a column fixed to a box and having teeth that are engaged in an internal thread of the roto-translating pin.

5. The locking system of claim 2, wherein the gear has a shaft axially protruding from the gear wheel, the shaft having an external thread engaged with an internal thread of the roto-translating pin.

6. The locking system of claim 5, wherein the roto-translating pin has an L-shaped cam surface engaged with a pin-shaped follower.

7. The locking system of claim 2, wherein said actuator has a box that houses said electric motor and said motion reducer, the head of the roto-translating pin projecting externally from the box and mounted in the box.

8. The locking system of claim 7, wherein said actuator has a support that is mounted in the box and rotatably supports the gear.

9. The locking system of claim 8, wherein said actuator has a security device that is manually actuatable by a user so as to unlock the movement of the roto-translating pin when said electric motor is stopped.

10. The locking system of claim 9, wherein the support is slidingly mounted in the box, the security device being spring mounted in the box so as to move from a locking position to which the support is locked to an unlocking position in which the support is unlocked and translatable in the box.

11. The locking system of claim 10, wherein the security device has an annular body disposed around the roto-translating pin and tongues that project downwardly from the annular body, wherein the tongues are stopped against a lateral wall of the support when the security device is in the locking position, wherein the tongues are slidable in slots and seats in the lateral wall of the support when the security device is in the unlocked position.

12. The locking system of claim 8, wherein the support has a first half-shell and a second half-shell, the support having an annular shape disposed around the roto-translating pin, the first half-shell and the second half-shell being coupled so as to house the gear.

13. The locking system of claim 9, wherein said actuator has springs disposed between the box and the support so as to urge the support toward a disengagement position in which said motion reducer is disengaged from said electric motor, wherein the security device has a spring disposed between the box and the security device so as to urge the security device towards the locking position.

14. The locking system of claim 1, wherein said actuator has a position sensor that detects when the roto-translating pin is in the extracted position.

* * * * *